3,321,536
ABNORMAL ADDITION OF HYDROGEN BROMIDE TO STYRENE
Frank J. Plesmid, Westfield, N.J., assignor to E. I. du Pont de Nemours and Company, Wilmington, Del., a corporation of Delaware
No Drawing. Filed Oct. 19, 1965, Ser. No. 498,148
1 Claim. (Cl. 260—651)

This application is a continuation-in-part of U.S. application Ser. No. 292,472, filed July 2, 1963, now abandoned, which is in turn a continuation-in-part of U.S. application Ser. No. 77,505, filed Dec. 22, 1960, now abandoned.

This invention relates to the preparation of beta-bromoethylbenzene.

The reaction of hydrogen bromide and styrene by abnormal addition to form beta-bromoethylbenzene is known in accordance with the following equation:

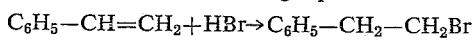

$$C_6H_5-CH=CH_2 + HBr \rightarrow C_6H_5-CH_2-CH_2Br$$

It is also known that the ionic reaction to produce the normal addition product is perhaps faster with styrene than with any other olefin. For example, Table 5 of Mayo and Walling, Chemical Reviews, volume 27, page 351, et seq. (1940), shows that styrene is the fastest reacting in normal addition of the representative compounds tabulated.

While abnormal addition of bromine to some unsaturated compounds has been favored by the presence of an oxidizing compound, this generalization cannot be carried over to styrene because of its strong tendency for normal addition, as mentioned above. For instance, an attempt in the prior art to bring hydrogen bromide and styrene together in the presence of oxygen (amount unspecified) produced phenolic substances, as reported by Takahasi in Bull. Chem. Soc. Japan, volume 29, pages 973 to 979 (1956). Additionally, the reaction of hydrogen bromide and styrene in the presence of air (amount unspecified) gave the normal bromoethylbenzene addition product rather than the abnormal, as shown by Mayo and Walling in the reference referred to above.

In general contrary to the teaching of this prior art, it has now been found according to the present invention that excellent results, i.e., outstanding yields of beta-bromoethylbenzene can be obtained when the above reaction is carried out in the presence of a very small and critical amount of oxygen.

According to the present invention, it is believed possible for the first time to obtain essentially 100% conversion of the above reactants to the desired beta-bromoethylbenzene. In addition, this invention permits continuing the reaction to a relatively high concentration of desired product in the reaction mass.

According to the present invention, particularly advantageous results are obtained by carrying out the reaction of hydrogen bromide and styrene to form beta-bromoethylbenzene in the presence of from about 0.02 to about 2.4 mol percent of oxygen, based on the amount of the hydrogen bromide gas. Below the approximate lower limit of 0.02, the reaction produces an undesirably large amount of the isomer alpha-bromoethylbenzene with a corresponding decrease in the rate of conversion to the desired beta isomer. Above the approximate upper limit of 2.4, the remarkably superior conversion is lowered and the general efficiency of the process deleteriously hindered because, as discovered in the present invention, undesirable reactions occur and possible loss of unreacted hydrogen bromide results.

The reaction according to this invention can be effected by introducing the hydrogen bromide, styrene and oxygen simultaneously into a suitable closed vessel. It is preferred that the vessel contain a liquid reaction mass, which can be a heel of liquid beta-bromoethylbenzene itself. The styrene is conveniently introduced through an inlet pipe in the upper part of the vessel. The hydrogen bromide and oxygen are sparged into the reaction mass below its surface through a dip tube or other suitable inlet means. The reaction proceeds most efficiently when the reaction mass is subjected to agitation.

In addition to the oxygen concentration, certain other process variables must be carefully controlled in order to achieve the exceptionally high yields of the desired isomer. It has already been noted that the reactants must be introduced into the liquid mass simultaneously. The reactant concentrations in the reaction mass must also be carefully controlled. It has been found that the styrene concentration must not be permitted to exceed 10 millirgams per milliler of reaction mass. The process is operable at styrene concentrations above 10 mg./ml. but the amount of alpha-bromoethylbenzene formed is substantial. Preferably, the styrene concentration is maintained below 5 mg./ml. Similarly, hydrogen bromide concentration must be maintained below 10 milligrams per milliliter of reaction mass.

There is actually no lower limit on the concentration of either the hydrogen bromide or the styrene, since the rate of addition can be extremely low, or the addition can even be interrupted, so that the concentration of one or both reactants become essentially zero, without affecting the yield of beta-bromoethylbenzene. As a practical matter, of course, it is preferred, once addition of reactants is started, to maintain or perhaps even increase the rate of addition until the desired amount of product has been obtained. Thus, the concentration of both hydrogen bromide and styrene will ordinarily not be less than 0.1 milligram per milliliter of reaction mass during operation of the process.

It is also important in obtaining yields of the beta isomer approaching theoretical that the molar ratio of hydrogen bromide to styrene in the reaction mass be mantained in excess of about 1, say between about 1 and 100, and preferably between about 1 and 10.

Reaction temperatures between about 25° and 100° C. are suitable, with particularly advantageous results between 35° and 75° C.

It is important that in the reaction mass there is not present in excess of about 1 part by weight of iron, or its oxides or salts calculated as iron, per million parts of reaction mass.

The hydrogen bromide used in the present process can be any commercial grade of anhydrous gaseous hydrogen bromide. The styrene likewise can be commercial grade, although it should be pointed out that if the commercially available styrene contains an additive and inhibitor such as tertiary butyl-catechol, the inhibitor can be removed according to instructions provided by the vendor or by any other suitable method before proceeding with the process of this invention. Good results have been obtained without such removal, however, and such removal is not necessary and an advantage of the present invention lies in making such removal nonessential.

The amount of water in the system preferably should not exceed about 100 parts by weight per million parts of all the other components in the system in order to avoid a water layer in the system.

Particular advantages are obtained using an inert hydrocarbon or halogenated hydrocarbon solvent. This can be all or partially liquid beta-bromoethylbenzene itself, and this latter product will of course form an increasingly larger portion of the reaction mass as it is produced.

This solvent should of course be miscible with the product beta-bromoethylbenzene and inert to hydrogen bromide and styrene. By inert is meant that the solvent is substantially nonreactive with the just-mentioned reactants. The solvent will generally have a dielectric constant at or below that of beta-bromoethylbenzene. Constants about 5.35 and below at 25° C. and $10^5$ cycles are satisfactory with preferred figures below about 3.0. The solvent also preferably and for convenience will have a boiling point of less than that of the beta-bromoethylbenzene, namely, about 220° C. at atmospheric conditions.

Suitable solvents include many well known, commercialy available saturated hydrocarbons. Typical straight chain aliphatic hydrocarbons are n-pentane, n-hexane, n-heptane, and n-octane. Typical commercial products are Esso Standard Oil Company hexane, B.P. range 66.5° C. to 69.5° C. and heptane, B.P. range 94.0° C. to 99.0° C. In the normal commercial sense, the named commercial hydrocarbons are "narrow cut" petroleum fractions which may in fact contain appreciable amounts of other hydrocarbons having similar boiling points. Thus, the named hydrocarbons can be present in amounts of perhaps 40% to 80% of the total. In addition to the above mixed fractions, a pure hydrocarbon, such as high purity n-heptane, at plus 99% content of the named hydrocarbon, can be used. Typical aryl hydrocarbons are benzene, ethyl benzene, chlorobenzene, toluene and ortho- meta- or para-dimethylbenzene. Typical suitable cyclic compounds are cyclohexane and methyl cyclohexane. Other useful solvents include carbon tetrachloride, carbon tetrabromide, 1,1,2,2-tetrachloroethane, tetrachloroethylene, 1,1,1-trichloroethane, dichlorodifluoromethane, dichlorofluoromethane, etc.

Preferred solvents are those hydrocarbons having from 5 to 9 carbon atoms per molecule. Of course, isomers and mixtures of such hydrocarbon solvents are satisfactory. Most preferred hydrocarbon solvents contain 6-8 carbon atoms per molecule. Illustrative of an outstanding solvent within this class is a petroleum derivative identified as "heptane," a mixture of various hydrocarbon solvents of approximately 6 or 7 carbon atoms and sold by American Mineral Spirits Company and Esso Standard Oil Company.

If a solvent is use, the beta-bromoethylbenzene can be recovered from the solvent solution by any suitable recovery means, such as vacuum distillation.

In normal operation, the hydrogen bromide gas and the liquid styrene will be introduced simultaneously into a closed vessel through separate entrances. Use of air in place of gaseous oxygen in order to provide an equivalent amount of oxygen is contemplated by the present invention. Normally, the desired amount of oxygen will be admixed with the stream of hydrogen bromide prior to its entrance into the vessel to minimize explosion hazards. The oxygen can be introduced into the reaction as such, or as air, or dissolved in either the liquid crude or solvent or both, provided the requisite amount of oxygen is present, as will be readily understood.

If a solvent is used, the reaction can conveniently be carried out by introducing the three essential components into the reaction until the concentration of desired product in the solvent has reached a desired level, which in this process can be as high as 75% or 80% or even higher. The feed streams to the reaction can of course be continuous or intermittent and also the reaction mass can be continuously or intermittently drawn off from the vessel with, if desired, a corresponding addition of more solvent to make up for that withdrawn. The styrene can conveniently be fed in solution in a portion of the solvent if desired.

By the practice of the present invention, it is believed that production of high purity beta-isomer can be attained that has not been heretofore possible on a commercial scale.

This process can of course be carried out in the presence of light or using one or more known catalysts for this reaction without interfering with the effectiveness of this invention, as will be readily understood.

This invention will be further described but is not intended to be limited by the following illustrative examples:

Example 1

A kettle arranged for temperature control by application of heating or cooling is charged with 2130 milliliters of commercial grade "heptane." The temperature is adjusted to 30° C. The kettle is totally emptied of air by application of 24 inches of vacuum and the vacuum released by admitting nitrogen to prevent return of air to the vessel. The kettle contents are further sparged with nitrogen for 15 minutes. The nitrogen feed is continued, and simultaneous introduction is commenced into the kettle of stoichiometric amounts of styrene and hydrogen bromide at rates that maintain an average concentration of about 0.9 milligram of styrene and 4.2 milligrams of hydrogen bromide per milliliter of reaction mass in the kettle. With the hydrogen bromide is admixed a controlled flow of air, in an amount of 3.5% by volume (3.5 mol percent of air) based on the hydrogen bromide. The inlet for the hydrogen bromide and air mixture is at its lower end submerged below the surface of the liquid mass in the kettle.

The process is operated for 90 minutes at a flow rate equivalent to 0.12 pound of beta-bromoethylbenzene product per gallon of reaction mass per hour, and then for an additional 3 hours at a flow rate equivalent to 0.48 pound per gallon per hour on the same basis. Iron and iron compounds are excluded from the process. At the end of the 4½ hour period, the temperature of the reaction mass has reached 29.5° C. The addition of reactants is stopped and the contents of the kettle analyzed.

The chemical yield of styrene to beta-bromoethylbenzene is 98.5% and of hydrogen bromide is 83.0%. The ratio of alpha isomer to beta isomer is less than 0.004.

Example 2

Example 1 is repeated, except that the temperature is maintained at 50° C.; the initial reaction period is 1 hour at a flow rate of 0.48 pound and a volumetric air rate of 10% (10 mol percent of air based on the hydrogen bromide) and the second reaction period is 4 hours at a flow rate of 1.9 pounds and volumetric air rate of 0.5 to 1.5% (0.5 to 1.5 mol percent of air). The concentration of styrene and hydrogen bromide in solution is maintained at an average of about 4.6 milligrams of styrene and about 3.4 milligrams of hydrogen bromide per milliliter of reaction mass. The end product is analyzed to contain 583 milligrams per milliliter of beta-bromoethylbenzene and less than 1 milligram per milliliter of alpha isomer. The chemical yield of styrene to beta isomer is 98.5% and of hydrogen bromide is 99.2%. The ratio of alpha isomer to beta isomer is less than 0.002.

Example 3

Example 2 is repeated except that pure oxygen on an equivalent basis is used in place of the air, with excellent results.

Example 4

Example 2 is repeated except that the styrene used as the starting material contains 17 parts by weight of p-tertiary butyl catechol per million parts of styrene, as available commercially. The concentration of styrene and hydrogen bromide in solution is maintained at an average of about 4.4 milligrams of styrene and about 3.7 milligrams of hydrogen bromide per milliliter of reaction mass. Results are excellent.

Example 5

Using the apparatus of Example 1, the kettle is charged with 2130 milliliters of commercial heptane and the temperature held at about 50° C. throughout the reaction time of 6 hours. In separate streams are introduced 456 grams of styrene and 360.5 grams of hydrogen bromide at rates to maintain a concentration of about 4.0 milligrams of styrene and about 4.5 milligrams of hydrogen bromide per milliliter of mass. With the hydrogen bromide is admixed 1% by volume of air (1 mol percent) based on the hydrogen bromide. Iron and iron containing materials are excluded from the process. At the end of the 6-hour reaction period, the contents of the kettle are analyzed. Conversion to beta-bromoethylbenzene is substantially 100%.

*Example 6*

Example 5 is repeated except that 0.2% by volume of pure oxygen (0.2 mol percent) is used in place of air; 361.5 grams of hydrogen bromide are added; and the concentration of hydrogen bromide is maintained at about 4.0 milligrams per milliliter of reaction mass. Results are substantially 100% conversion to the beta isomer.

*Example 7*

Example 5 is repeated using 2130 milliliters of carbon tetrachloride; a total reaction time of 2 hours and 40 minutes; a feed of 468 grams of styrene and 369 grams of hydrogen bromide with 10% by volume of air (10 mol percent) based on the hydrogen bromide; and an average concentration of about 5.0 milligrams of styrene and about 4.0 milligrams of hydrogen bromide per milliliter of mass; to obtain substantially 100% conversion to the beta isomer.

In these latter examples, a small amount of nitrogen can be added with the air or oxygen if desired.

The above examples can be repeated utilizing other process conditions and variables in accordance with the present invention and following the teachings set forth herein, as will be readily understood. In particular, other suitable temperatures within the prescribed range can be used as well as other solvents mentioned above and otherwise having the characteristics prescribed herein above.

The invention claimed is:

In a process for the reaction of hydrogen bromide and styrene to form beta-bromoethylbenzene, the improvement comprising simultaneously introducing into a closed vessel containing a heel of liquid beta-bromoethylbenzene reaction mass, hydrogen bromide at a rate such that the amount of unreacted hydrogen bromide will not exceed 10 milligrams per milliliter of reaction mass, and styrene at a rate such that amount of unreacted styrene will not exceed 10 milligrams per milliliter of reaction mass, the molar ratio of hydrogen bromide to styrene in the reaction mass being maintained in excess of 1, heating said reactants at a temperature between about 25° C. and 100° C., agitating said reactants during the course of the reaction, maintaining the amount of water in the system below about 100 parts by weight per million parts of all the other reactants, carrying out said reaction in the presence of a solvent which is miscible with beta-bromoethylbenzene and inert to hydrogen bromide and styrene, said solvent characterized by having a dielectric constant of no greater than 5.35 at 25° C. and $10^5$ cycles, and carrying out said reaction in the presence of from about 0.02 to about 2.4 mole percent of oxygen based on the amount of hydrogen bromide.

References Cited by the Examiner

UNITED STATES PATENTS

| | | | |
|---|---|---|---|
| 2,082,946 | 6/1937 | Fluchaire et al. | 260—651 |
| 2,299,411 | 10/1942 | Rust et al. | 260—651 X |
| 2,440,800 | 5/1948 | Hanford | 260—658 |
| 2,935,535 | 5/1960 | Asadorian | 260—651 |

OTHER REFERENCES

Mayo et al.: "Chemical Reviews," vol. 27 (1940), pp. 366–369, 388–394.

Walling et al.: "Jour. Amer. Chem. Soc." vol. 6, (1939), pp. 2693–6.

BERNARD HELFIN, *Acting Primary Examiner.*

K. V. ROCKEY, T. G. DILLAHUNTY,

*Assistant Examiners.*